United States Patent [19]

Tabacchi et al.

[11] Patent Number: 4,601,555
[45] Date of Patent: Jul. 22, 1986

[54] METAL FRAME FOR EYEGLASSES

[76] Inventors: Vittorio Tabacchi; Vincenzo Viel, both of VII Strada, n.20, Padova, Z.I., Italy

[21] Appl. No.: 642,174
[22] Filed: Aug. 20, 1984
[51] Int. Cl.⁴ ............................................. G02C 1/08
[52] U.S. Cl. ....................................... 351/90; 351/95
[58] Field of Search ................................. 351/90–102

[56] References Cited
U.S. PATENT DOCUMENTS
2,006,917 7/1935 Haag ...................................... 351/90

Primary Examiner—Rodney B. Bovernick
Attorney, Agent, or Firm—Howard Schuldenfrei

[57] ABSTRACT

A metal frame for eyeglasses, comprising a front frame having a pair of lens-bearing rims to each of which there is fastened, on its outermost part, a nose for the hinging of a temple piece. Each nose is formed of a monolithic block and each rim is cut at the place corresponding to the corresponding nose so as to define two branches, one fastened to the nose and the other connected to it by a threaded pin.

9 Claims, 7 Drawing Figures

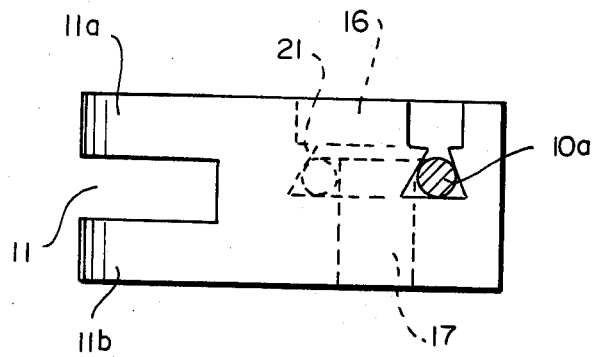
FIG. 3
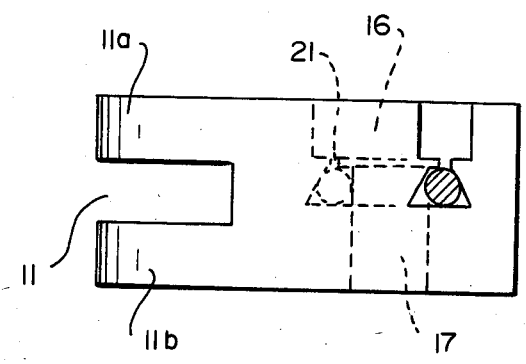
FIG. 4
FIG. 5
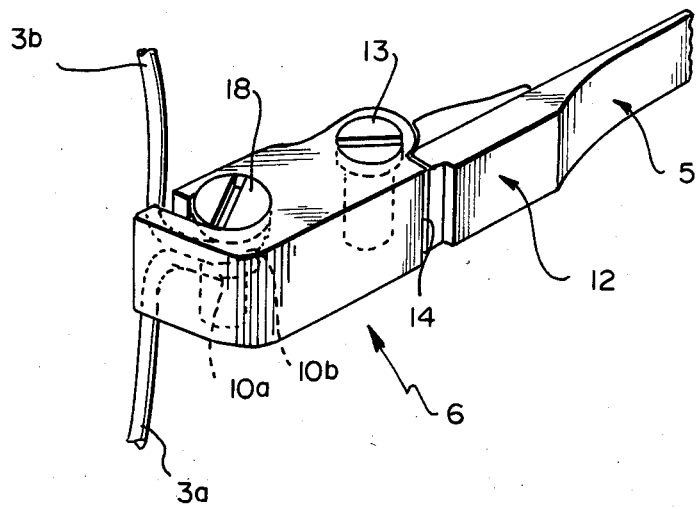

METAL FRAME FOR EYEGLASSES

BACKGROUND OF THE INVENTION

The object of the present invention is a metal frame for eyeglasses of the type comprising a front frame with a pair of lens-bearing rims to each of which there is fastened, on its outermost part, a nose for the hinging of a temple piece.

In metal frames for eyeglasses of the type specified above, in particular in flexible frames, the most critical region is represented by the portion of the front frame to which the nose is connected.

The traditional techniques provide, in fact, for the welding of the nose to the lens-bearing rim, with consequent heating of this region of the front frame and therefore with the possibility of producing permanent deformations in said region during the use of the frame.

Previous studies by the present applicant suggest cutting the lens-bearing rim at the place corresponding to the region of attachment of the nose and fastening the cut ends of the rim, by form-fitting coupling, to a pair of small plates which, locked by abutment to each other, form a hinge seat for the temple piece, while at the same time again closing the lens-holder rim.

This technical solution is, however, not without its drawbacks; in particular, it is not possible, due to the requirement of locking by abutment one plate on the other, to take up possible small errors in cutting and/or beveling of the lens for which it is necessary to adjust the size of the lens-bearing rim. Therefore the risk remains of lens rejects or of obtaining lenses which are not sufficiently firm in the frame.

The object of the present invention is to produce a metal eyeglass frame which overcomes the drawbacks mentioned above in connection with the prior art.

SUMMARY OF THE INVENTION

This object is achieved by the invention by a frame of the type specified above which is characterized by the fact that each of said noses is formed of a monolithic block and each rim is cut at the place corresponding to the corresponding nose so as to define two branches, one fastened to the nose and the other connected to it by a threaded pin.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

The characteristics and advantages of the invention will become clear from the detailed description of three preferred, but not exclusive, embodiments of a metal frame for eyeglasses according to the invention shown, by way of illustration and not of limitation, in the accompanying drawings, in which:

FIGS. 3 and 4 illustrate diagrammatically in lateral elevation two successive phases of assembly of the nose to the frame of FIG. 1;

FIG. 5 is a perspective view of the nose of the preceding figures fastened to the corresponding rim with a temple piece being shown in part;

DETAILED DESCRIPTION OF THE INVENTION

Figure 1:
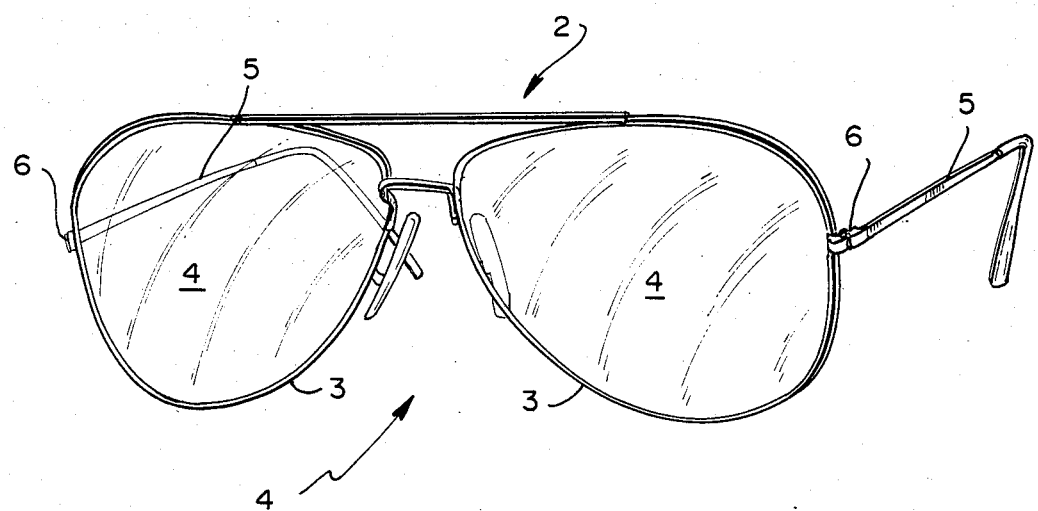
FIG. 1 is a perspective view of a metal frame for eyeglasses according to the invention.
Figure 2:
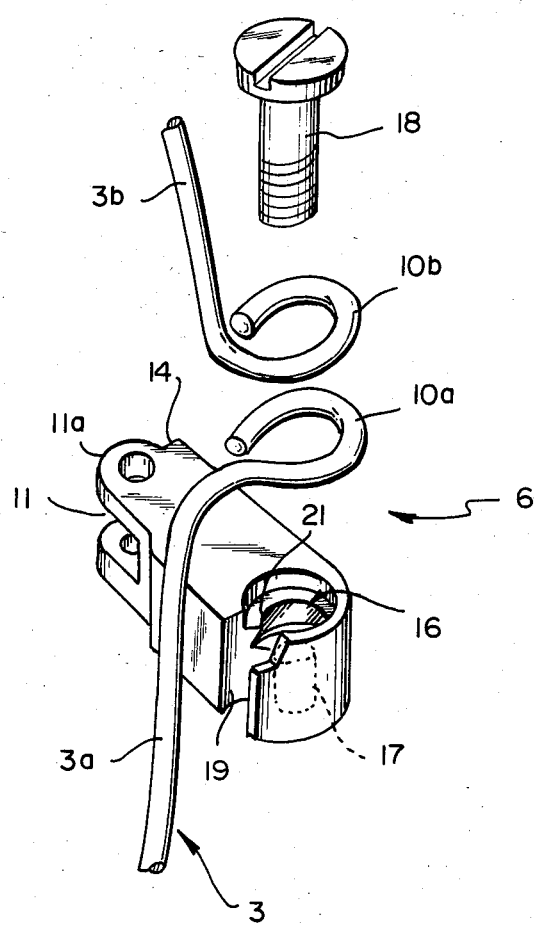
FIG. 2 shows, in perspective view, an enlarged detail of FIG. 1.

Referring to the above-mentioned figures, an eyeglass frame, designated generally as 1, comprises a front frame 2 with rims 3 surrounding corresponding lenses 4.

To the front frame 2 there are hinged temple pieces 5 connected by noses 6 which are fastened to the rims 3.

Each nose which is fastened to the front frame on the outermost part of the latter, is composed of a monolithic block of substantially prismatic shape and predominantly longitudinal development; at the place corresponding to the corresponding nose 6, each rim 3 is cut so as to form two branches 3a, 3b, with the end portions 10a, 10b bent to form eyelets.

The eyelets 10a, 10b are then bent into a plane which is substantially at right angles to the corresponding branch 3a, 3b of the rim 3.

The nose 6 forms at one end a seat 11 for the hinging of the corresponding temple piece 5; this seat 11 is defined between facing wings 11a, 11b extending in lengthwise direction on the nose and suitably spaced so as to receive a hinge end 12 of the temple piece 5, shaped in conventional manner.

The wings 11a, 11b are traversed by a screw 13 constituting a hinge pin for the end 12.

The nose 6 furthermore forms, on the most outer part of the front frame 2 and in position adjacent the wings 11a, 11b, a shoulder 14 developed parallel to the axis of the screw 13 and constituting a stop upon the opening of the temple piece 5.

Near the end which is longitudinally opposite the seat 11, there is provided in the nose 6 a recess 16 of substantially circular section whose axis is substantially transverse to the nose and parallel to the hinge axis of the temple piece 5. Coaxial to the recess 16 the remaining portion of the nose is traversed by a threaded hole 17, in which there is engaged a screw 18 which passes through the eyelets 10a, 10b.

More precisely the recess 16 is provided, in intermediate position, with a ring-shaped moulding 21 which imparts to the said recess a substantially trapezoidal cross section near its bottom.

For the assembling of the nose to the corrresponding rim of the frame 1 the eyelet 10a is placed on the bottom of the recess 16 and the moulding 21 is pressed down as shown in FIGS. 3 and 4 in order to hold the nose 6 firmly on the branch 3a of the rim 3.

On the part facing the rim 3 the nose has a hollowed-out groove 19 developed transversely and substantially parallel to the axis of the recess 16 and of the hole 17; the groove 19 is open at the place corresponding to the recess 16 to receive the branches 3a, 3b of the rim 3.

Figure 6:
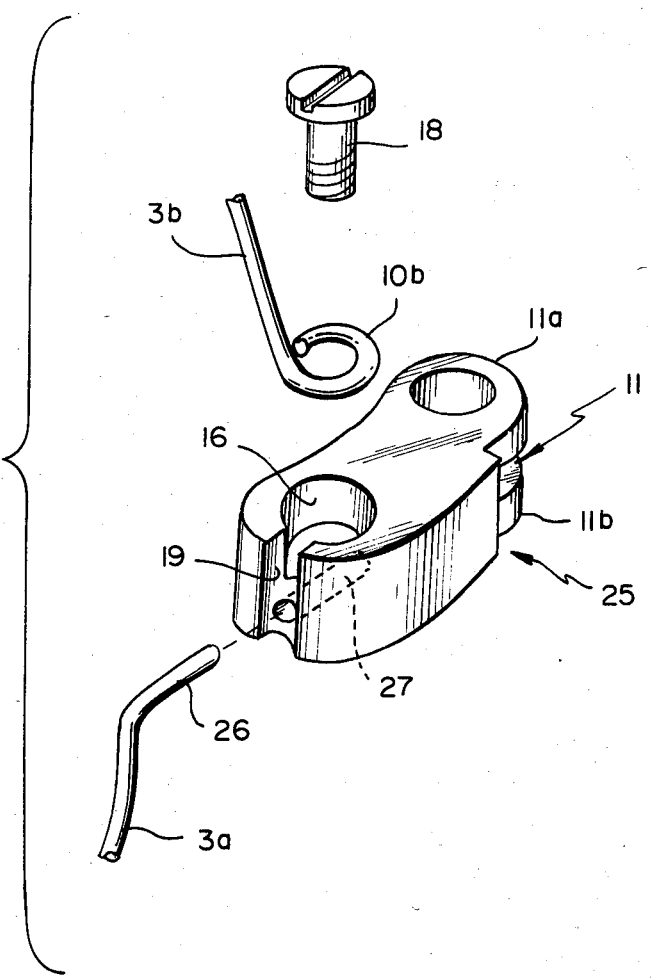
FIG. 6 illustrates a variant of the nose previously shown.

In FIG. 6 there is shown a detail of a first variant of the frame according to the invention in which similar details bear the same numbers as previously used.

Differing from the previous embodiment, the branch 3a of the rim 3 has an end 26 which is bent at a right angle and inserted into a hole 27 in the nose 25, said hole passing longitudinally through part of the nose starting from the groove 19.

The end 26 of the branch 3a is held in the hole 27 by force-fit, cementing or other equivalent technique.

In this case the seat 16 does not have a moulding since it is intended solely to receive and hold fast the bent eyelet end 10b of the arm 3b by means of the screw 18.

Figure 7:
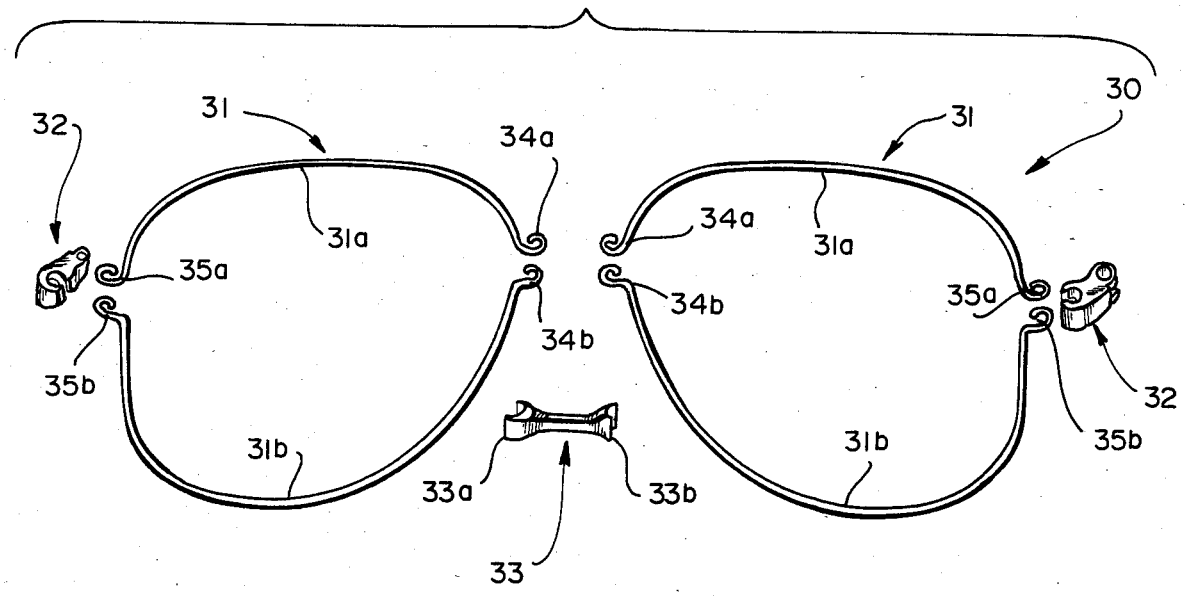
FIG. 7 is a further variant of the frame according to the invention, shown diagrammatically in perspective.

FIG. 7 is an exploded view of a front frame of an eyeglass frame indicated generally as 30.

The front frame 30 comprises a pair of lens-bearing rims 31 provided, on the outermost part thereof, with noses 32 and in the center with a bridge 33 connecting the rims 31 to each other.

By way of example the noses 32 are of the type shown in FIGS. 2 to 5, to which reference is had for a detailed description of them.

Each rim 31 is formed of a pair of arcs 31a and 31b bent at their facing ends to form eyelets 34a and 35a in the case of the arc 31a, and 34b and 35b in the case of the arc 31b respectively.

Both the eyelets 34a and 34b and 35a and 3b have the same shape as previously described with reference to the connection of noses 6, 25.

The bridge 33 is provided, at opposite ends 33a, 33b, with seats which are entirely similar to what has been described previously with reference to the noses 6, 25, to which reference is had for structural details.

The assembling of the frame of the invention is effected as follows: The nose 6, 25 is fastened to the branch 3a of the corresponding lens-holding rim; the fastening is effected in the first case by pressing the moulding 21 onto the eyelet 10a and in the second case by forced fit between the end 26 and the hold 27.

The lens 4 is then placed in the corresponding rim 3 and the screw 18 is engaged in the hole 17 after passing through the eyelet 10b.

By tightening the screw 18, the latter acts as pull member on the branch 3b, therefore tightening the rim 3 around the lens 4.

In this way small clearances in the lens 4 relative to the rim 3 are taken up without changing the quality of the hinge connection between the nose 6, 25 and the temple piece 5.

The same adjustment can be effected in a frame using the front piece shown in FIG. 7 in which the noses 32 may possibly be of the conventional type and the adjustment of the play of the lens in the rims 31 is delegated to the connection between the ends 34a and 34b thereof with the bridge 33.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A metal frame for eyeglasses comprising a front frame having a pair of lens-bearing rims, a pair of temple pieces and means for hingedly connecting each temple piece to a corresponding rim, the means including a nose characterized in that it is a monolithic block of substantially prismatic shape and predominantly longitudinal development, a pair of branches formed in each rim for connecting an end of the nose to the rim, one branch being fixedly connected to the nose and the other being demountably connected to it, a seat formed in the other end of the nose, an end of the temple piece being received in the seat and means for hingedly connecting the nose to the seated end of the temple piece.

2. The metal frame for eyeglasses as claimed in claim 1 wherein each branch formed in the rim terminates in a respective eyelet bent into a plane which is substantially at right angles to the corresponding branch.

3. The metal frame for eyeglasses as claimed in claim 2 wherein the seat in the nose comprises a pair of facing wings formed in the nose, the wings extending in lengthwise direction on the nose and being spaced to receive a hinge end of the temple piece.

4. The metal frame for eyeglasses as claimed in claim 3 wherein the means for hingedly connecting the nose to the seated end of the temple piece comprises a hinge pin which traverses the wings.

5. The metal frame for eyeglasses as claimed in claim 4 including means for stopping the pivotal movement of the temple piece about the hinge pin to an open position comprising a shoulder formed in the nose adjacent to the wings and parallel to the axis of the hinge pin.

6. The metal frame for eyeglasses as claimed in claim 2 having in the end of the nose longitudinally opposite the seat a recess of substantially circular section whose axis is substantially transverse to the nose and parallel to the hinge axis of the temple piece in which the eyelets formed at the ends of the rims are received, and coaxial to the recess the remaining portion of the nose is traversed by a threaded hole and a screw engaged in the threaded hole which passes through the eyelets.

7. The metal frame for eyeglasses as claimed in claim 6 wherein a ring-shaped moulding is mounted in intermediate position in the recess and imparts to the recess a substantially trapezoidal cross-section near its bottom, the moulding being force fitable over an eyelet mounted in the bottom of the recess and fixedly connecting it therein.

8. The metal frame for eyeglasses as claimed in claim 7, the nose having a hollowed out groove therein developed transversely and substantially parallel to the axis of the recess and threaded hole also formed therein, the groove being opened at the place corresponding to the recess for receiving respective branches of a rim.

9. The metal frame for eyeglasses as claimed in claim 1 wherein one branch formed in the rim terminates in an eyelet, which is substantially at a right angle to the corresponding branch and the other branch formed in the rim having an end bent at substantially a right angle thereto, the end of the nose longitudinally opposite the seat having a recess of substantially circular section with an axis substantially transverse to the nose and parallel to the hinge axis of the temple piece in which the eyelet formed at the end of the one branch of the rim is received, a hollowed out groove formed in the nose transversely and substantially parallel to the axis of the recess, the groove being opened at the place corresponding to the recess for receiving respective branches of the rim, a hole passing longitudinally through part of the nose starting from the groove for receiving the bent end of the other branch, the bent and being fixedly connected in the hole.

* * * * *